United States Patent
Duboue

(10) Patent No.: US 10,657,525 B2
(45) Date of Patent: May 19, 2020

(54) METHOD AND APPARATUS FOR DETERMINING EXPENSE CATEGORY DISTANCE BETWEEN TRANSACTIONS VIA TRANSACTION SIGNATURES

(71) Applicant: Kasisto, Inc., New York, NY (US)

(72) Inventor: Pablo Ariel Duboue, Vancouver (CA)

(73) Assignee: Kasisto, Inc., New York, NY (US)

( * ) Notice: Subject to any disclaimer, the term of this patent is extended or adjusted under 35 U.S.C. 154(b) by 444 days.

(21) Appl. No.: 15/634,212

(22) Filed: Jun. 27, 2017

(65) Prior Publication Data

US 2018/0374089 A1    Dec. 27, 2018

(51) Int. Cl.

| | | |
|---|---|---|
| *G06Q 20/38* | (2012.01) | |
| *G06N 3/08* | (2006.01) | |
| *G06F 9/455* | (2018.01) | |
| *G06F 16/903* | (2019.01) | |
| *G06N 3/04* | (2006.01) | |
| *G06F 8/30* | (2018.01) | |

(52) U.S. Cl.
CPC .......... *G06Q 20/3825* (2013.01); *G06F 8/30* (2013.01); *G06F 9/45533* (2013.01); *G06F 9/45558* (2013.01); *G06F 16/90335* (2019.01); *G06N 3/0454* (2013.01); *G06N 3/088* (2013.01)

(58) Field of Classification Search
CPC . G06Q 20/3825; G06F 16/90335; G06F 8/30; G06F 9/45533; G06F 9/45558; G06N 3/0454; G06N 3/088
See application file for complete search history.

(56) References Cited

U.S. PATENT DOCUMENTS

| | | | | |
|---|---|---|---|---|
| 4,454,610 A | * | 6/1984 | Sziklai | G07C 9/247 382/119 |
| 9,063,978 B1 | * | 6/2015 | Kapoor | G06F 16/24564 |
| 9,542,710 B1 | * | 1/2017 | Izrailevsky | G06Q 40/12 |
| 9,811,827 B2 | * | 11/2017 | Naguib | G06Q 20/3825 |
| 2005/0203970 A1 | | 9/2005 | McKeown et al. | |
| 2008/0025617 A1 | * | 1/2008 | Posse | G06K 9/62 382/224 |
| 2008/0077570 A1 | * | 3/2008 | Tang | G06F 16/3344 |

(Continued)

FOREIGN PATENT DOCUMENTS

| | | |
|---|---|---|
| CN | 101079026 A | 7/2007 |
| WO | 0079426 A1 | 12/2000 |

OTHER PUBLICATIONS

Wikipedia, "Autoencoder," https://en.wikipedia.org/wiki/Autoencoder, Mar. 19, 2017, 5 pages.

(Continued)

*Primary Examiner* — Scott C Anderson
(74) *Attorney, Agent, or Firm* — Ryan, Mason & Lewis, LLP

(57) ABSTRACT

A method for transaction analysis comprises extracting a plurality of character groups from a plurality of transaction identifiers, determining an inverse document frequency value for each of the plurality of character groups, generating, for a first transaction and a second transaction, respectively, a first transaction signature and a second transaction signature corresponding to the plurality of character groups, and computing a distance between the first and second transaction signatures.

26 Claims, 7 Drawing Sheets

(56) References Cited

U.S. PATENT DOCUMENTS

| | | | |
|---|---|---|---|
| 2010/0097662 A1* | 4/2010 | Churilla | H04N 1/00795 |
| | | | 358/448 |
| 2015/0330990 A1 | 11/2015 | Salafsky et al. | |
| 2016/0179945 A1 | 6/2016 | Lastra Diaz et al. | |
| 2016/0307043 A1* | 10/2016 | Neumeier | G06F 16/786 |
| 2017/0085509 A1* | 3/2017 | Fernandez | H04L 51/12 |
| 2017/0103264 A1* | 4/2017 | Javan Roshtkhari | |
| | | | G06K 9/00718 |
| 2018/0211330 A1* | 7/2018 | Ran | G06Q 40/12 |
| 2019/0130015 A1* | 5/2019 | Zhang | G06N 7/005 |

OTHER PUBLICATIONS

Wikipedia, "n-gram," https://en.wikipedia.org/wiki/N-gram, Feb. 26, 2017, 14 pages.

* cited by examiner

METHOD AND APPARATUS FOR DETERMINING EXPENSE CATEGORY DISTANCE BETWEEN TRANSACTIONS VIA TRANSACTION SIGNATURES

TECHNICAL FIELD

The field generally relates to the communication of financial transactions as executed by customers and, in particular, to determining a distance between respective transactions based on transaction signatures.

BACKGROUND

Financial institutions, such as, for example, banks and/or credit card companies provide information to their customers regarding their spending. Such information can be in the form of, for example, monthly statements itemizing financial transactions, including, for example, purchases and returns. The information may also be provided on-demand based upon, for example, a customer inquiry through an appropriate interface. When storing and communicating aggregated results for multiple transactions, financial institutions may rely on automated systems to group transactions based on transaction categories such as, but not necessarily limited to, food, healthcare, groceries, sporting goods, dining, travel, etc.

The current techniques for transaction communication and categorization are prone to error and are difficult to apply across multiple financial institutions, which may use different phrases and/or word fragments to describe a given transaction.

SUMMARY

According to an exemplary embodiment of the present invention, a method for transaction analysis comprises extracting a plurality of character groups from a plurality of transaction identifiers, determining which of the plurality of character groups are statistically correlated with a category, determining an inverse document frequency value for each of the statistically correlated character groups, generating, for a first transaction and a second transaction, respectively, a first transaction signature and a second transaction signature corresponding to the statistically correlated character groups, and computing a distance between the first and second transaction signatures.

According to an exemplary embodiment of the present invention, a system for transaction analysis comprises a memory and at least one processor coupled to the memory, wherein the at least one processor is configured to extract a plurality of character groups from a plurality of transaction identifiers, determine which of the plurality of character groups are statistically correlated with a category, determine an inverse document frequency value for each of the statistically correlated character groups, generate, for a first transaction and a second transaction, respectively, a first transaction signature and a second transaction signature corresponding to the statistically correlated character groups, and compute a distance between the first and second transaction signatures.

According to an exemplary embodiment of the present invention, an article of manufacture comprises a processor-readable storage medium having encoded therein executable code of one or more software programs, wherein the one or more software programs when executed by one or more processing devices implement the steps of extracting a plurality of character groups from a plurality of transaction identifiers, determining which of the plurality of character groups are statistically correlated with a category, determining an inverse document frequency value for each of the statistically correlated character groups, generating, for a first transaction and a second transaction, respectively, a first transaction signature and a second transaction signature corresponding to the statistically correlated character groups, and computing a distance between the first and second transaction signatures.

According to an exemplary embodiment of the present invention, a method for transaction analysis comprises extracting a plurality of character groups from a plurality of transaction identifiers, determining an inverse document frequency value for each of the plurality of character groups, generating, for a first transaction and a second transaction, respectively, a first transaction signature and a second transaction signature corresponding to the plurality of character groups, and computing a distance between the first and second transaction signatures.

According to an exemplary embodiment of the present invention, system for transaction analysis comprises a memory and at least one processor coupled to the memory, wherein the at least one processor is configured to determine whether a first transaction and a second transaction belong to the same category, wherein in determining whether the first and second transactions belong to the same category, the at least one processor is configured to calculate a distance between a first transaction signature corresponding to the first transaction and a second transaction signature corresponding to the second transaction, wherein the first and second transaction signatures each comprise a plurality of character groups derived from respective first and second identifiers of the first and second transactions.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION

Figure 1:
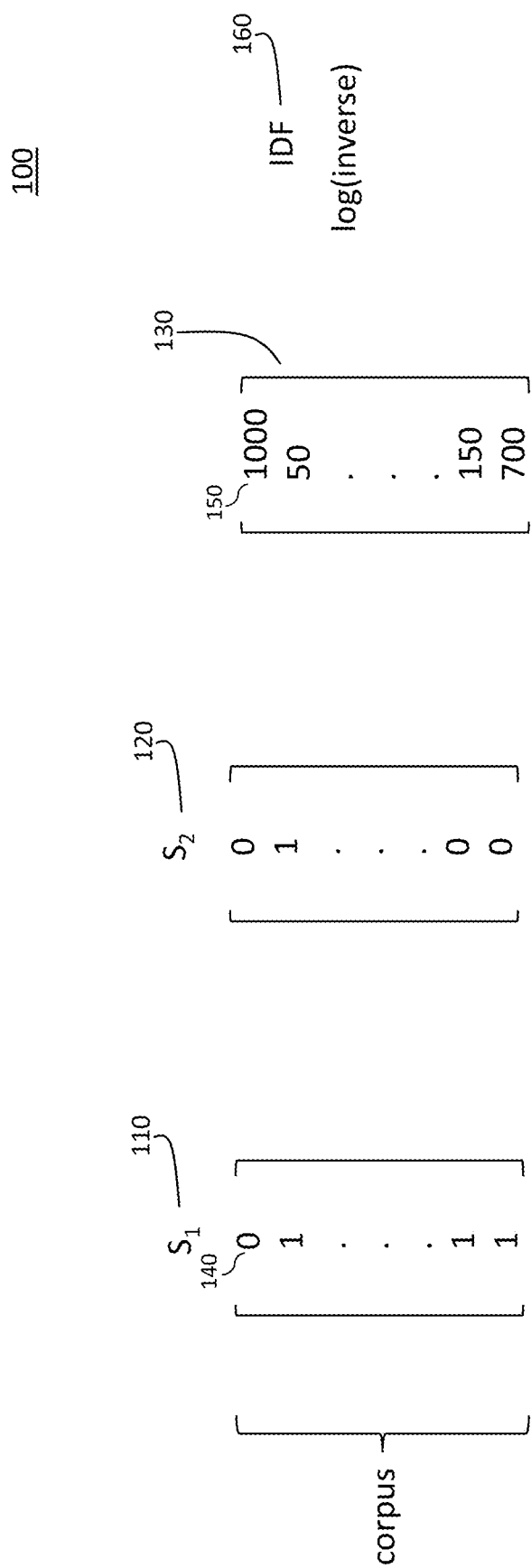
FIG. 1 is a diagram illustrating transaction signature and inverse document frequency vectors, according to an exemplary embodiment of the present invention.

Exemplary embodiments of the invention will now be discussed in further detail with regard to analysis of transactions and, in particular, to using transaction signatures to find distance between transactions. This invention may, however, be embodied in many different forms and should not be construed as limited to the embodiments set forth herein.

As used herein, a network, can refer to, but is not necessarily limited to, a local area network (LAN), wide area network (WAN), cellular network, satellite network or the Internet. Network communication can be performed via one or more centralized servers or cloud data centers that receive, analyze and send data to and from one or client devices, such as, for example, smart phones, tablets or other computing devices, that, by way of example, are part of the network.

As used herein, "natural language processing (NLP)" can refer to interactions between computers and human (natural) languages, where computers are able to derive meaning from human or natural language input, and respond to requests and/or commands provided by a human using natural language.

As used herein, "natural language understanding (NLU)" can refer to a sub-category of natural language processing in artificial intelligence (AI) where natural language input is disassembled and parsed to determine appropriate syntactic and semantic schemes in order to comprehend and use languages. NLU may rely on computational models that draw from linguistics to understand how language works, and comprehend what is being said by a user.

As used herein, "non-natural language", "non-natural language request" or "non-natural language command" can refer to an application programming interface (API) call to an organizational server for retrieving user-specific/personalized data, such as, but not necessarily limited to, account balance and/or transaction information from a bank or organization, or other data. These API calls are not in natural language.

In accordance with an embodiment of the present invention, key markers can be used to determine whether two transactions are related. For example, transactions containing parts of words (e.g., phonemes, syllables, letters), words and/or phrases for example, "offee" or "restau", might be related to each other. Given two transactions, it may be possible to associate them to a target category (e.g., Food, Retail, Travel, etc.), which is a problem of importance for artificial intelligence (AI) systems (e.g., financial AI systems) interacting with humans in natural language. A related task is to determine whether two transactions fall under the same category. This task can be of particular utility as it is independent of the categories being employed. It is to be understood that while examples herein may be in connection with financial institutions, the embodiments of the present invention are not necessarily limited thereto, and may be applicable to other fields where information may be categorized and/or organized in terms of transactions or other events.

Embodiments of the present invention provide a method to compute transaction distances based on transaction signatures, derived from the transaction text itself (and potentially enriched from other sources).

As used herein, a "transaction", "transaction text", or "transaction identifier" can refer to a combination of characters (e.g., alphanumeric characters) identifying a financial transaction. For example, the character combination can identify a vendor, merchant, supplier, or other entity through which the financial transaction was performed and/or payment for goods and/or services was received, or a location at which the financial transaction was performed and/or payment for goods and/or services was received. Illustrative examples can include, but are not limited to, "ROCK-EFELLER UNIV DIRECT DE", "NYC-TAXI YELLOW CAB", "Stubhub", "BATHANDBODYWORKS.COM", "Bath & Body Works", "The Leopard at des Artistes" and "THE LEOPARD AT DES ART."

In accordance with an embodiment of the present invention, given a large amount of transactions with annotated categories, all of the character segments (referred to herein as "n-grams") are extracted from the transactions or transaction texts. As used herein, "n-grams" refer to segments of a plurality of characters, for example, but not necessarily limited to, groups of 3-6 letter, numeric and/or alphanumeric characters, which are derived from a transaction text identifying a given transaction. For example, an n-gram can include a continuous sequence of letters, which may form part of a word (e.g., phoneme, syllable) or a word. In accordance with an embodiment of the present invention, an n-gram may also include segments of characters with "wildcard" locations in-between some characters. The wildcard location corresponds to more than one character that may fit in that particular location. For example, an n-gram may be in the form of R?N, where the ? represents the wildcard location, which may correspond to different characters resulting in different combinations, such as, for example, RUN, RAN, RIN and RTN. Such n-grams may be referred to as "skip n-grams."

The n-grams that are statistically correlated with a category (any category) are kept based on a suitable statistical test (e.g., Chi square). It is determined which n-grams to keep using a training set of transactions with categories, and calculating a statistical correlation between each n-gram and a category using the statistical test, including but not necessarily limited to Chi square. Other statistical tests can include, for example, a likelihood ratio test, Student's t-test or other statistical test. These n-grams constitute the "transaction signature."

For example, a transaction "ROCKEFELLER UNIV DIRECT DE" can result in a transaction signature (also referred to herein as a "signature") of n-grams <ELLE, ELLER, RECT, ROCK, ELL, LLE, EFE, IRECT, ERU, OCKE, LLER, UNI, DIRE, CKE, FELL, UNIV, IREC, ROC, RUN, DIREC, FEL, DIR, KEF, REC, OCK, ECT, LER, NIV, IRE>, a transaction of "NYC-TAXI YELLOW CAB" can result in a signature of n-grams <YEL, ELL, YELL, TAX, ELLO, LLOW, LLO, AXI, WCA, LOW, NYC, TAXI, OWC, ELLOW>, and a transaction of "Stubhub" can result in a signature of n-gram <STU>.

Referring to FIG. 1, a transaction signature can be represented as a vector $S_1$ 110 or $S_2$ 120 of fixed size where each n-gram has a fixed position between the vector. The fixed size is referred to herein as the feature vector size. The features (also referred to as machine learning features) include the informative n-grams that have been kept as a result of the statistical test. For example, the vector may be based on a vector size of 16,000 n-grams. The number of n-grams in a vector will vary based on the results of the statistical test. Each entry in the vector can contain one of two numbers 140, which are 1 (the n-gram appears) or 0 (the n-gram does not appear). In the case of a vector size of 16,000 n-grams, the vector for a given transaction signature will include 16,000 entries of 0 or 1 indicating whether each n-gram appears in that signature. FIG. 1 shows a signature $S_1$ 110 of a first transaction and $S_2$ 120 of a second transaction for which a distance between the signatures is being computed. Alternatively, instead of binary entries of 0 and 1 for each n-gram, a vector can be based on normal counts indicating an actual number of appearances of an n-gram in that signature. For example, each entry in the vector can contain 0 (the n-gram does not appear) or the actual number of times (e.g., 1, 2, 3, etc.) an n-gram appears in that signature.

On a collection of transactions (the transactions do not need to be annotated with categories), a total count for each n-gram in the signatures can be computed. For example, referring to vector 130 of FIG. 1, the total counts 150 for each n-gram in the signatures are shown as 1000, 50, . . . , 150 and 700, indicating that respective n-grams appear 1000, 50, 150 and 700 times in the signatures. The counts 150 are representative of n-grams from multiple signatures. The logarithm of the inverse (I/N) for each count 150 constitutes the inverse document frequency (IDF) 160 for that signature coordinate.

In accordance with an embodiment of the present invention, given two transactions, a distance between them can be computed by calculating the dot product, Euclidean distance, cosine distance, a Manhattan distance or a Hamming distance between their signature vectors (e.g., 110 and 120) multiplied by their inverse document frequency (IDF) weights.

For example, the following resulting numbers represent the distance between the signatures for the transactions below calculated as the dot product between the signatures, weighted by frequencies of each signature dimension.

distance(The Winery, The Lenz Winery)= 0.23392910406517722;

distance(The Lenz Winery, MICROSOFT EDIPAYMENT)=0.32202212798165675;

distance(MICROSOFT EDIPAYMENT, MICROSOFT*OFFICE)= 0.24436852960980807;

distance(MICROSOFT*OFFICE 365, mcdonald's)= 0.3455075495663583; and distance(macdonalds, mcdonald's)= 0.1817838684743054.

The embodiments of the present invention are based on term frequency—inverse document frequency (TF*IDF) character distance between strings, using a corpus of category annotated examples to find the n-grams that are meaningful to the task.

Figure 2:
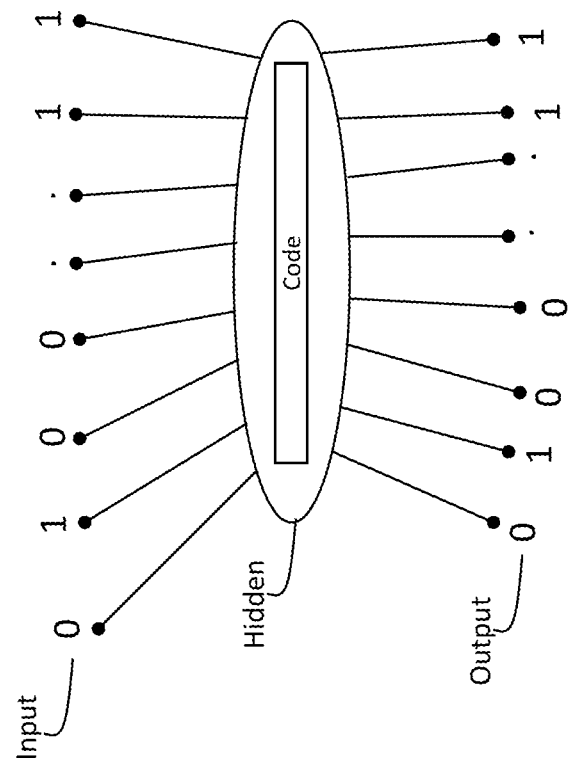
FIG. 2 is a diagram illustrating an autoencoder, according to an exemplary embodiment of the present invention.

Referring to FIG. 2, embodiments of the present invention can be improved using an autoencoder 200, where a large vector can be projected into a smaller vector by training a neural network to reconstruct its input using a smaller hidden layer. As used herein, an "autoencoder" refers to a neural network utilizing an unsupervised learning algorithm that applies backpropagation, setting the target values to be equal to the inputs. An autoencoder attempts to learn a function for a set of data, generally for the purpose of dimensionality reduction. In other words, the autoencoder 200 is attempting to learn a code in the hidden layer so that the output is the same as the input. In order to obtain the code, backpropagation of errors is performed if the output is not the same as the input. The output layer has the same number of nodes as the input layer, while the hidden layer, which supplies the encoding algorithm after a number of training iterations, has a smaller dimension than the input and output layers. In a non-limiting illustrative example, the input and output layers can have 16,000 nodes, while the code uses only 25 nodes. In accordance with an embodiment of the present invention, the dot product, Euclidean distance, cosine distance, Manhattan distance or Hamming distance is computed using the code having the reduced size.

Embodiments of the present invention also may expand the transaction text using a collection of related documents. For example, the transaction text can be expanded using the first paragraph of the top on-line encyclopedia (e.g., Wikipedia®) document resulting from an Internet search using the transaction text as a search query.

Figure 3:
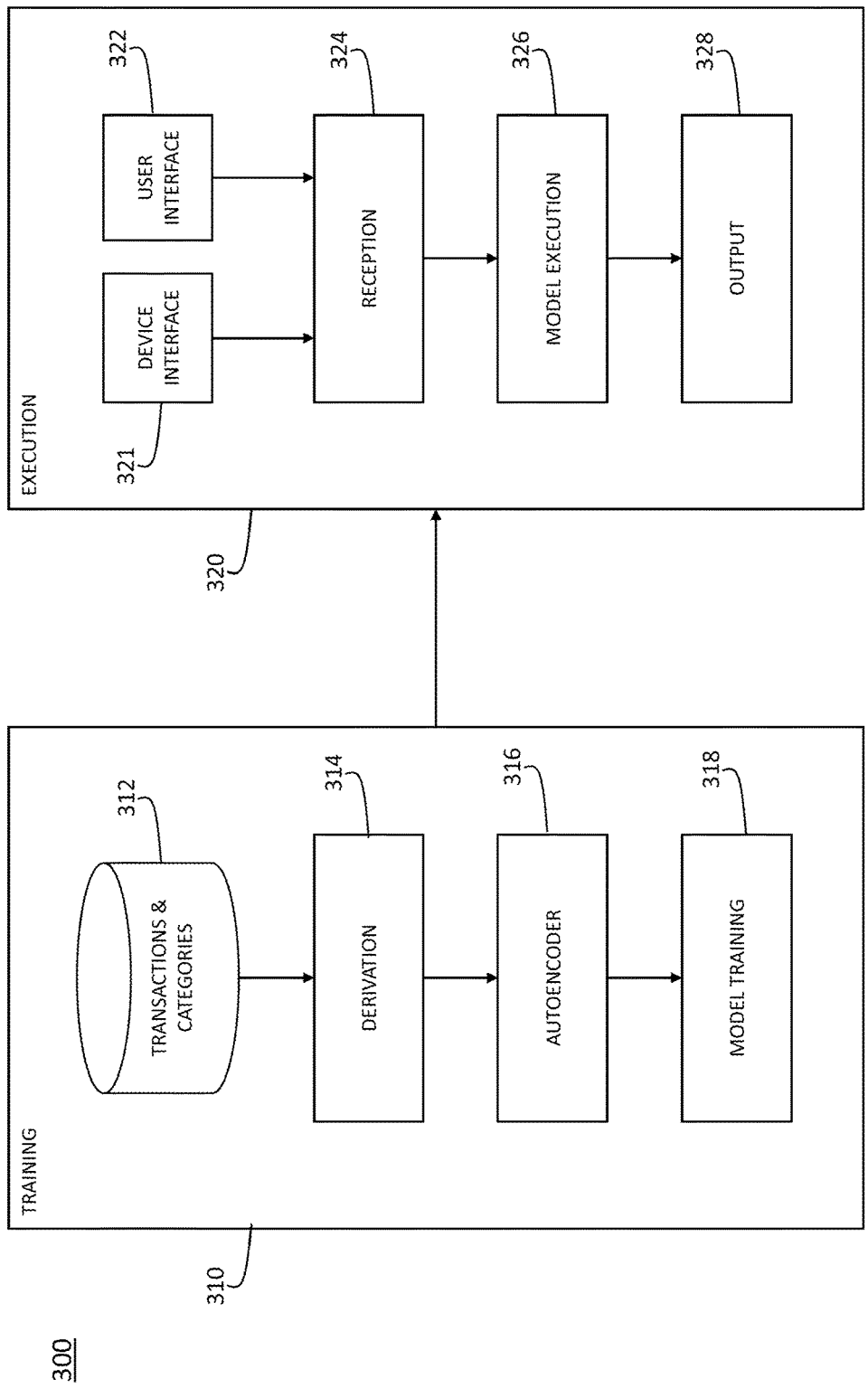
FIG. 3 is a block diagram of a system for transaction analysis, according to an exemplary embodiment of the present invention.

FIG. 3 is a block diagram of a system for transaction analysis, according to an exemplary embodiment of the present invention. As shown in FIG. 3 by lines and/or arrows, the components of the system 300 are operatively connected to each other via, for example, physical connections, such as wired and/or direct electrical contact connections, and/or wireless connections, such as, for example, WiFi, BLUETOOTH, IEEE 802.11, and/or networks, including but not limited to, a local area network (LAN), wide area network (WAN), cellular network, ad hoc networks, wireless ad hoc network (WANET), satellite network or the Internet.

By way of non-limiting example, in accordance with an embodiment of the present invention, referring to FIG. 3, a system for transaction analysis 300 includes a training module 310 and an execution module 320. The training module 310 includes a derivation component 314, an autoencoder 316 and model-training component 318. The execution module 320 includes a device interface component 321, a user interface component 322, a reception component 324, a model execution component 326 and an output component 328.

In performing a training operation, the derivation component 314 receives transactions with annotated categories 312, and extracts a plurality of character groups (e.g., n-grams) from a plurality of transaction identifiers as described herein. The derivation component 314 also determines which of the plurality of character groups are statistically correlated with a category by, for example, performing a suitable statistical test, such as, but not necessarily limited to, a chi square test, and discards the character groups that are not statistically correlated with a category. Transaction signatures are based on the remaining character groups, which constitute a feature vector size as described in connection with FIG. 1. The derivation component 314 further determines inverse document frequency (IDF) counts for the remaining character groups. Determining the IDF counts for each of the statistically correlated character groups can comprise computing a total count of each statistically correlated character group in a plurality of transaction signatures.

The derivation component 314 can also generate transaction signatures for respective transactions, which are based on the statistically correlated character groups, and compute distances between the respective transaction signatures. As noted herein, computing the distance between transaction signatures may comprise calculating a dot product between a first signature vector corresponding to a first transaction signature and a second signature vector corresponding to a second transaction signature, and multiplying the dot product by the IDF value for each of the statistically correlated character groups. Alternatively, the distance between the first and second transaction signatures can be a Euclidean distance, a cosine distance, a Manhattan distance or a Hamming distance. As described in connection with FIG. 2, the feature vector size and consequent dimensions of the signature vectors can be reduced using a neural network, such as an autoencoder 316. According to an embodiment of the present invention, the transactions can be extended with textual sources comprising, for example, search results where transaction identifiers for the transactions are used as search queries.

The model-training component 318 uses the results from the derivation component 314, and the autoencoder 316 if one is used, to train a model to be used by the execution module 320 in connection with responding to requests and/or inquiries made by a user 305. A trained model can include, for example, a database of transaction signatures with corresponding categories (e.g., expense categories, such as, retail, travel, food, etc.) and/or values indicating which categories are closest to the signatures. Another trained model can include the k-most similar signatures found in training, and their corresponding categories weighted according to distance between the signatures. The distances can be calculated using, for example, dot product or other distance techniques described herein.

Figure 4:
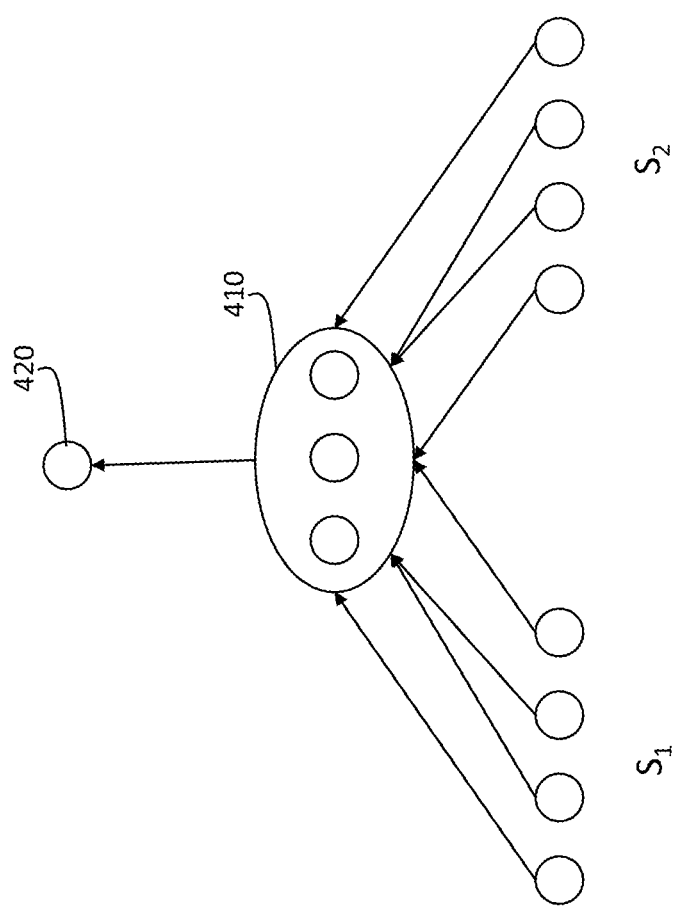
FIG. 4 is a diagram illustrating a neural network classifier, according to an exemplary embodiment of the present invention.

Another trained model can include a neural network classifier to produce distance between signatures. FIG. 4 is a diagram illustrating a neural network classifier 400, according to an exemplary embodiment of the present invention. Referring to FIG. 4, two (or more) transaction signatures $S_1$ and $S_2$ are input to a neural network 410 or other machine learning engine, which outputs a score 420 indicating the similarity or lack thereof between the two signatures $S_1$ and $S_2$.

The execution module 320 includes an appropriate device interface 321 that supports interaction with other devices, such as, for example, credit card machines, merchant servers, financial institution servers, smart phones, tablets, desktop or laptop personal computers (PCs), or other computing devices, that, by way of example, are part of a network. As noted herein, the network, which can connect one or more components of the system to each other, can refer to, but is not necessarily limited to, a LAN, WAN, cellular network, satellite network or the Internet. The execution module 320 is configured to receive transaction information, including transaction identifiers for transactions that have been processed by or on behalf of a user 305.

The execution module 320 also includes an appropriate user interface 322 that supports interaction with a user 305 via, for example, user devices, such as, for example, landline telephones, mobile telephones, smart phones, tablets, desktop or laptop personal computers (PCs) or other computing devices, that, by way of example, are part of the network noted herein. The execution module 320 is configured to understand natural language commands received from a user 305 via a user device. Although shown separately, the device and user interfaces 321 and 322 may be integrated in a single component.

In operation, in a non-limiting illustrative example, transactions, such as purchases or payments may be processed by or on behalf of a user 305, and received via device or user interface 321, 322. The transactions may be assigned transaction identifiers by, for example, merchants or financial institutions processing the transactions. A reception component 324 processes the identifiers, and forwards them to model execution component 326, where they can be processed to extract character groups and generate transaction signatures for processing by the models from the model training component 318 to determine to which expense categories the transactions should be assigned.

For example, the transaction signatures generated by the model execution component 326 can be compared to a database of transaction signatures with corresponding categories for a match with an existing signature-category combination. The model execution component 326 associates the corresponding categories from the matching transaction signatures with the newly generated transaction signatures so that the output component 328 can output a resulting transaction-category combination based on the match.

Alternatively, the distance between the transaction signatures generated by the model execution component 326 and the k-most similar signatures generated during training can be calculated using, for example, dot product or other distance calculation methods described herein. Based on the calculated distances, the model execution component 326 can determine which of the signature categories from the training data correspond to each newly generated signature. The output component 328 can output the corresponding categories for each newly generated signature weighted by the distance from the training signatures, along with the distance scores and corresponding transaction identifiers for the compared signatures.

In another alternative, a neural network classifier, such as neural network classifier 400 described in connection with FIG. 4, can produce distance between, for example a signature associated with a category and a newly generated signature that has not been assigned to a category. A neural network or other machine-learning engine, outputs a score via output component 328 indicating the similarity or lack thereof between the two signatures. Based on the closest scores, the model execution component 326 can determine to which category a newly received transaction can be assigned, and output this result via the output component 328.

In another operation, a user 305 may make a request or inquiry for information about one or more transactions that may have been performed in connection with a user account, such as a user account with a bank or other type of financial institution. Such a request may be received via user interface 322 and be in the form of a voice request where the user interface 322 includes a computer program comprising a chatbot or other artificial conversational entity, or a textual request received, for example, online through a graphical user interface (GUI). An example of a user request or inquiry may seek information regarding, for example, how much money was spent for a given time period in connection with a particular expense category identified by the user. For example, a user may inquire how much they spent on fast food, clothing, travel, etc. during a given time period, or ask where they spent a specified amount on a particular item or in a particular category. In accordance with an embodiment of the present invention, such requests can be received by the reception component 324, and, using the methods described herein, the model execution component 326 can generate a transaction signature based on the request. Once a transaction signature has been generated, the model execution component 326 can determine an appropriate expense category for the request using the methods described herein. The determined category can be used in subsequent processing to look up data for matching transactions and respond to the user inquiry.

Figure 5:
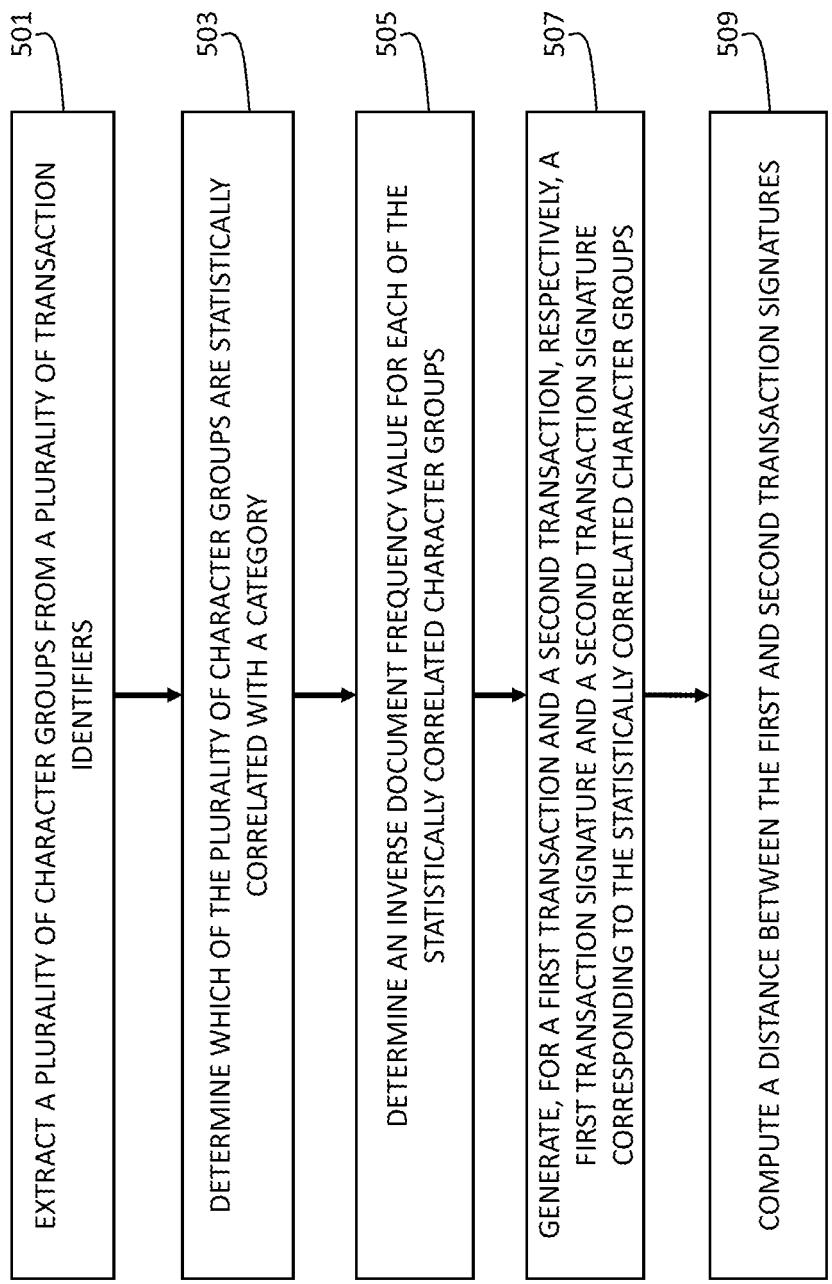
FIG. 5 is a flow diagram of a process for transaction analysis, according to an exemplary embodiment of the invention.

FIG. 5 is a flow diagram of a process for transaction analysis, according to an exemplary embodiment of the invention. Referring to FIG. 5, the process 500 includes, at block 501, extracting a plurality of character groups from a plurality of transaction identifiers. The plurality of character groups can comprise a plurality of n-grams, including a number "n" of characters, such as, for example, letters. The number of characters may vary to include one or more characters. According to an embodiment, the number of characters in an n-gram or character group is between 3 and 6. The process 500, at block 503, further includes determining which of the plurality of character groups are statistically correlated with a category. This determination can be made by performing a suitable statistical test, such as, but not necessarily limited to, a chi square test. In accordance with an embodiment of the present invention, the character groups of the extracted character groups that are not statistically correlated with a category are discarded.

At block 505, an inverse document frequency (IDF) value for each of the statistically correlated character groups is determined. Determining the IDF value for each of the statistically correlated character groups can comprise computing a total count of each statistically correlated character group in a plurality of transaction signatures.

The process 500, at block 507, further includes generating, for a first transaction and a second transaction, respectively, a first transaction signature and a second transaction signature corresponding to the statistically correlated character group, and, at block 509 computing a distance between the first and second transaction signatures. Computing the distance between the first and second transaction signatures may comprise calculating a dot product between a first signature vector corresponding to the first transaction signature and a second signature vector corresponding to the second transaction signature, and multiplying the dot product by the IDF value for each of the statistically correlated character groups. Alternatively, the distance between the first and second transaction signatures can be a Euclidean distance, a cosine distance, a Manhattan distance or a Hamming distance.

The first and second signature vectors may each be a fixed size, and each of the statistically correlated character groups can have a fixed position between each of the first and second signature vectors. The plurality of character groups can be of varying length.

Where the first and second transaction signatures are represented using respective first and second transaction signature vectors, the process for transaction analysis can also include reducing the dimensions of the first and second transaction signature vectors by projecting the first and second transaction signature vectors into smaller vectors by training a neural network to reconstruct its input using a smaller hidden layer. The neural network can utilize an unsupervised learning algorithm.

According to an embodiment of the present invention, the first transaction and/or the second transaction can be extended with a first textual source and a second textual source, respectively. The first and the second textual sources may respectively comprise: (1) a result of a search where a transaction identifier for the first transaction is used as a search query; and (2) a result of a search where a transaction identifier for the second transaction is used the search query.

Figure 6:
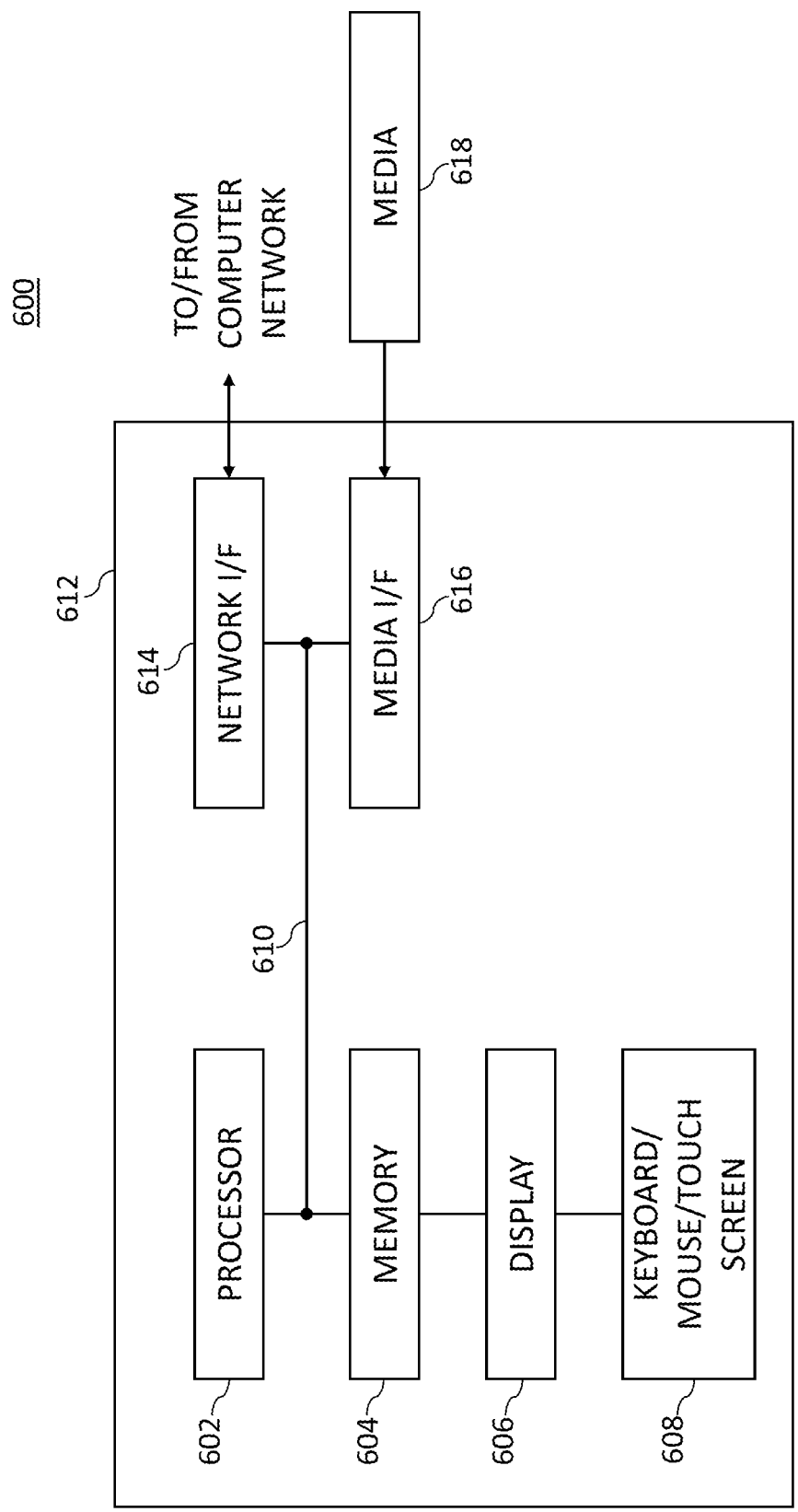
FIG. 6 illustrates a computer system in accordance with which one or more embodiments of the invention can be implemented, according to an exemplary embodiment of the invention.

FIG. 6 illustrates a computer system 600 in accordance with which one or more embodiments of a transaction analysis system can be implemented. That is, one, more than one, or all of the components and/or functionalities shown and described in the context of FIGS. 1-5 can be implemented via the computer system depicted in FIG. 6.

By way of illustration, FIG. 6 depicts a processor 602, a memory 604, and an input/output (I/O) interface formed by a display 606 and a keyboard/mouse/touchscreen 608. More or less devices may be part of the I/O interface. The processor 602, memory 604 and I/O interface are interconnected via computer bus 610 as part of a processing unit or system 612 (such as a computer, workstation, server, client device, etc.). Interconnections via computer bus 610 are also provided to a network interface 614 and a media interface 616. Network interface 614 (which can include, for example, transceivers, modems, routers and Ethernet cards) enables the system to couple to other processing systems or devices (such as remote displays or other computing and storage devices) through intervening private or public computer networks (wired and/or wireless). Media interface 616 (which can include, for example, a removable disk drive) interfaces with media 618.

The processor 602 can include, for example, a central processing unit (CPU), a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 602. Memory 604 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 604 may comprise electronic memory such as random access memory (RAM), read-only memory (ROM) or other types of memory, in any combination. The one or more software programs when executed by a processing device such as the processing unit or system 612 causes the device to perform functions associated with one or more of the components/steps of system/methodologies in FIGS. 1-5. One skilled in the art would be readily able to implement such software given the teachings provided herein. Other examples of processor-readable storage media embodying embodiments of the invention may include, for example, optical or magnetic disks.

Still further, the I/O interface formed by devices 606 and 608 is used for inputting data to the processor 602 and for providing initial, intermediate and/or final results associated with the processor 602.

Figure 7:
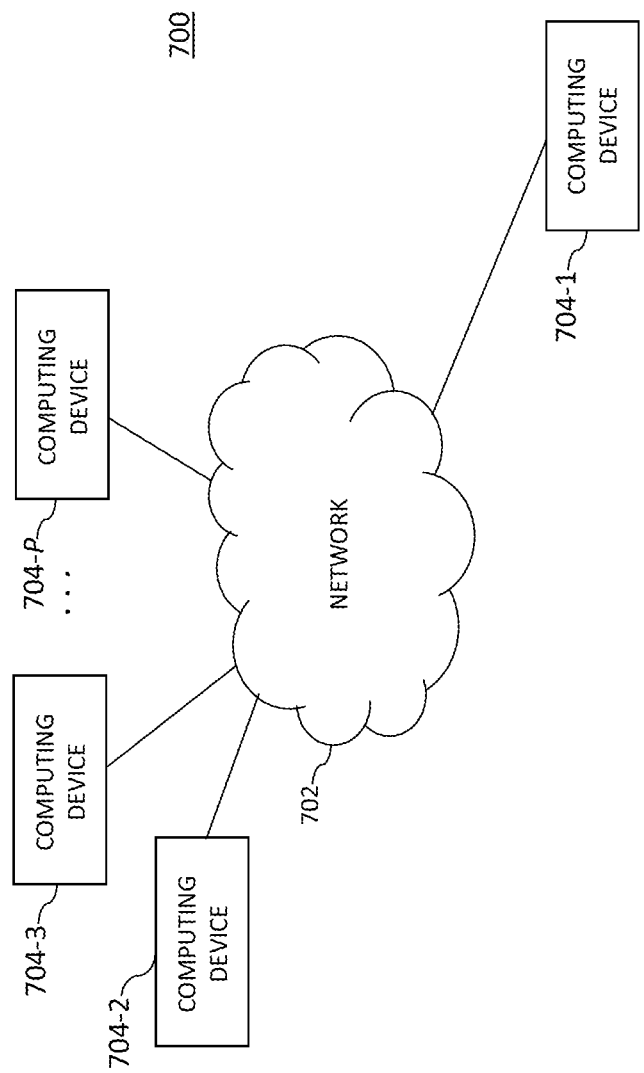
FIG. 7 illustrates a distributed communications/computing network in accordance with which one or more embodiments of the invention can be implemented, according to an exemplary embodiment of the invention.

FIG. 7 illustrates a distributed communications/computing network (processing platform) in accordance with which one or more embodiments of the invention can be implemented. By way of illustration, FIG. 7 depicts a distributed communications/computing network (processing platform) 700 that includes a plurality of computing devices 704-1 through 704-P (herein collectively referred to as computing devices 704) configured to communicate with one another over a network 702.

It is to be appreciated that one, more than one, or all of the computing devices 704 in FIG. 7 may be configured as shown in FIG. 6. It is to be appreciated that the methodologies described herein may be executed in one such computing device 704, or executed in a distributed manner across two or more such computing devices 704. It is to be further appreciated that a server, a client device, a processing device or any other processing platform element may be viewed as an example of what is more generally referred to herein as a "computing device." The network 702 may include, for example, a global computer network such as the Internet, a wide area network (WAN), a local area network (LAN), a satellite network, a telephone or cable network, or various portions or combinations of these and other types of networks (including wired and/or wireless networks).

As described herein, the computing devices 704 may represent a large variety of devices. For example, the computing devices 704 can include a portable device such as a mobile telephone, a smart phone, personal digital assistant (PDA), tablet, computer, a client device, etc. The computing devices 704 may alternatively include a desktop or laptop personal computer (PC), a server, a microcomputer, a workstation, a kiosk, a mainframe computer, or any other information processing device which can implement any or all of the techniques detailed in accordance with one or more embodiments of the invention.

One or more of the computing devices 704 may also be considered a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device, the context of which is apparent from the description.

Additionally, as noted herein, one or more modules, elements or components described in connection with embodiments of the invention can be located geographically-remote from one or more other modules, elements or components. That is, for example, the modules, elements or components shown and described in the context of FIGS. 1-5 can be distributed in an Internet-based environment, a mobile telephony-based environment, a kiosk-based environment and/or a local area network environment. The transaction analysis system, as described herein, is not limited to any particular one of these implementation environments. However, depending on the operations being performed by the system, one implementation environment may have some functional and/or physical benefits over another implementation environment.

The processing platform 700 shown in FIG. 7 may comprise additional known components such as batch processing systems, parallel processing systems, physical machines, virtual machines, virtual switches, storage volumes, etc. Again, the particular processing platform shown in this figure is presented by way of example only, and may include additional or alternative processing platforms, as well as numerous distinct processing platforms in any combination. Also, numerous other arrangements of servers, clients, computers, storage devices or other components are possible in processing platform 700.

Furthermore, it is to be appreciated that the processing platform 700 of FIG. 7 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 700 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It is to be appreciated that combinations of the different implementation environments are contemplated as being within the scope of embodiments of the invention. One of ordinary skill in the art will realize alternative implementations given the illustrative teachings provided herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. Additionally, the terms "comprises" and/or "comprising," as used herein, specify the presence of stated values, features, steps, operations, modules, elements, and/or components, but do not preclude the presence or addition of another value, feature, step, operation, module, element, component, and/or group thereof.

Advantageously, embodiments of the present invention determine whether two transactions belong to the same expense category by using transaction signatures and defining a metric over the signatures. The transaction signatures comprise character segments (character n-grams) of varying length. The signatures can be vectors of unbound size and allow for the reconstruction of the original transaction. In another embodiment, the signatures can comprise character segments on a fixed list determined from a large collection of annotated examples, where the signatures are vectors of fixed size and do not allow for the reconstruction of the original transaction. The signatures may include a reduced vector of real numbers obtained by a deep learning projection of a larger vector of fixed length of character segments. According to an embodiment, the projection technique includes the use of deep learning autoencoders, but other projection techniques, such as, but not necessarily limited to, random hashing, principal component analysis (PCA) or latent Dirichlet allocation (LDA) can be used.

According to an embodiment of the present invention, the distance between transaction signatures can be calculated using dot product, Euclidean distance, cosine distance, a Manhattan distance or a Hamming distance between the signatures. The distance can be weighted by the IDF of the character segments on a training corpus. The signatures can be computed over the original transaction extended with other textual sources, such as with the first paragraph of the top document obtained when using the transaction text as a search query, or with other textual sources obtained via data mining from sources accessible via one or more networks described herein.

Embodiments of the present invention provide improvements in computer technology over existing automated systems of transaction analysis, which may analyze transactions based on words instead of character groups (e.g., n-grams), leading to problems and an inability to analyze the transactions when the transactions are identified using truncated words or fragments, and/or groupings of letters that are not words or parts of words.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for transaction analysis, comprising:
    training a computational model, the training comprising:
        extracting a plurality of character groups from a plurality of transaction identifiers associated with a plurality of transactions corresponding to a plurality of categories;
        determining which of the plurality of character groups are statistically correlated with a category of the plurality of categories;
        determining an inverse document frequency value for each of the statistically correlated character groups;
        generating, for the plurality of transactions, respective transaction signatures corresponding to the statistically correlated character groups; and
        computing a plurality of distances between the respective transaction signatures;
    generating, based on the trained computational model, at least one of: (i) a database of the respective transaction signatures associated with one or more categories of the plurality of categories; and (ii) a plurality of values comparing the plurality of categories to the respective transaction signatures;
    receiving, via a communication network, information associated with at least one input transaction performed on behalf of at least one user in connection with at least one user account, wherein the information comprises at least one input transaction identifier;
    generating at least one input transaction signature based on the at least one input transaction identifier; and
    executing the trained computational model to assign the at least one input transaction to at least one of the plurality of categories;
    wherein the method is performed by at least one computer system comprising at least one memory and at least one processor connected to the memory.

2. The method according to claim 1, wherein the plurality of character groups comprise a plurality of n-grams.

3. The method according to claim 2, wherein the plurality of n-grams comprise skip n-grams.

4. The method according to claim 1, wherein computing the plurality of distances between the respective transaction signatures comprises calculating a plurality of dot products between respective pairs of signature vectors corresponding to the respective transaction signatures.

5. The method according to claim 4, wherein computing the plurality of distances between the respective transaction signatures further comprises multiplying the plurality of dot products by the inverse document frequency value for each of the statistically correlated character groups.

6. The method according to claim 4, wherein each of the signature vectors is a fixed size.

7. The method according to claim 4, wherein each of the statistically correlated character groups has a fixed position between each of the respective pairs of signature vectors.

8. The method according to claim 1, wherein each of the plurality of distances between the respective transaction signatures comprises one of a Euclidean distance, a cosine distance, a Manhattan distance and a Hamming distance.

9. The method according to claim 1, wherein the plurality of character groups are of varying length.

10. The method according to claim 1, wherein determining which of the plurality of character groups are statistically correlated with a category comprises performing at least one of a chi square test, a likelihood ratio test and a Student's t-test.

11. The method according to claim 1, wherein determining the inverse document frequency value for each of the statistically correlated character groups comprises computing a total count of each statistically correlated character group in a plurality of transaction signatures.

12. The method according to claim 1, further comprising:
    representing the respective transaction signatures using respective transaction signature vectors; and
    reducing the dimensions of the respective transaction signature vectors.

13. The method according to claim 12, wherein the reducing is performed using a neural network utilizing an unsupervised learning algorithm.

14. The method according to claim 1, further comprising extending at least one of the plurality of transactions with a textual source.

15. The method according to claim 14, wherein the textual source comprises a result of a search where a transaction identifier for the at least one of the plurality of transactions is used as a search query.

16. A system for transaction analysis, comprising:
    a memory and at least one processor coupled to the memory, wherein the at least one processor is configured to:
        train a computational model wherein, in training the computational model, the at least one processor is configured to:
            extract a plurality of character groups from a plurality of transaction identifiers associated with a plurality of transactions corresponding to a plurality of categories;
            determine which of the plurality of character groups are statistically correlated with a category of the plurality of categories;
            determine an inverse document frequency value for each of the statistically correlated character groups;
            generate, for the plurality of transactions, respective transaction signatures corresponding to the statistically correlated character groups; and
            compute a plurality of distances between the respective transaction signatures;
        generate, based on the trained computational model, at least one of: (i) a database of the respective transaction signatures associated with one or more categories of the plurality of categories; and (ii) a plurality of values comparing the plurality of categories to the respective transaction signatures;
        receive, via a communication network, information associated with at least one input transaction performed on behalf of at least one user in connection with at least one user account, wherein the information comprises at least one input transaction identifier;

generate at least one input transaction signature based on the at least one input transaction identifier; and execute the trained computational model to assign the at least one input transaction to at least one of the plurality of categories.

17. The system according to claim 16, wherein the plurality of character groups comprise a plurality of n-grams.

18. The system according to claim 16, wherein in computing the plurality of distances between the respective transaction signatures, the at least one processor is configured to calculate a plurality of dot products between respective pairs of signature vectors corresponding to the respective transaction signatures.

19. The system according to claim 18, in computing the plurality of distances between the respective transaction signatures, the at least one processor is further configured to multiply the plurality of dot products by the inverse document frequency value for each of the statistically correlated character groups.

20. The system according to claim 16, wherein in determining the inverse document frequency value for each of the statistically correlated character groups, the at least one processor is configured to compute a total count of each statistically correlated character group in a plurality of transaction signatures.

21. An article of manufacture comprising a processor-readable storage medium having encoded therein executable code of one or more software programs, wherein the one or more software programs when executed by one or more processing devices implement the steps of:

training a computational model, the training comprising:
extracting a plurality of character groups from a plurality of transaction identifiers associated with a plurality of transactions corresponding to a plurality of categories;
determining which of the plurality of character groups are statistically correlated with a category of the plurality of categories;
determining an inverse document frequency value for each of the statistically correlated character groups;
generating, for the plurality of transactions, respective transaction signatures corresponding to the statistically correlated character groups; and
computing a plurality of distances between the respective transaction signatures;

generating, based on the trained computational model, at least one of: (i) a database of the respective transaction signatures associated with one or more categories of the plurality of categories; and (ii) a plurality of values comparing the plurality of categories to the respective transaction signatures;

receiving, via a communication network, information associated with at least one input transaction performed on behalf of at least one user in connection with at least one user account, wherein the information comprises at least one input transaction identifier;

generating at least one input transaction signature based on the at least one input transaction identifier; and executing the trained computational model to assign the at least one input transaction to at least one of the plurality of categories.

22. A method for transaction analysis, comprising:
training a computational model, the training comprising:
extracting a plurality of character groups from a plurality of transaction identifiers associated with a plurality of transactions corresponding to a plurality of categories;
determining an inverse document frequency value for each of the plurality of character groups;
generating, for the plurality of transactions, respective transaction signatures corresponding to the plurality of character groups; and
computing a plurality of distances between the respective transaction signatures;

generating, based on the trained computational model, at least one of: (i) a database of the respective transaction signatures associated with one or more categories of the plurality of categories; and (ii) a plurality of values comparing the plurality of categories to the respective transaction signatures;

receiving, via a communication network, information associated with at least one input transaction performed on behalf of at least one user in connection with at least one user account, wherein the information comprises at least one input transaction identifier;

generating at least one input transaction signature based on the at least one input transaction identifier; and executing the trained computational model to assign the at least one input transaction to at least one of the plurality of categories;

wherein the method is performed by at least one computer system comprising at least one memory and at least one processor connected to the memory.

23. The method according to claim 22, wherein the plurality of character groups comprise a plurality of n-grams.

24. The method according to claim 22, wherein computing the plurality of distances between the respective transaction signatures comprises calculating a plurality of dot products between respective pairs of signature vectors corresponding to the respective transaction signatures.

25. The method according to claim 24, wherein computing the plurality of distances between the respective transaction signatures further comprises multiplying the plurality of dot products by the inverse document frequency value for each of the plurality of character groups.

26. The method according to claim 22, wherein determining the inverse document frequency value for each of the plurality of character groups comprises computing a total count of each character group in a plurality of transaction signatures.

* * * * *